US012786940B2

(12) United States Patent
Yang et al.

(10) Patent No.: US 12,786,940 B2
(45) Date of Patent: Nov. 3, 2026

(54) SYSTEMS AND METHODS FOR SIDELINK POSITIONING

(71) Applicant: ZTE Corporation, Shenzhen (CN)

(72) Inventors: Qi Yang, Shenzhen (CN); Chuangxin Jiang, Shenzhen (CN); Junpeng Lou, Shenzhen (CN); Yu Pan, Shenzhen (CN); Mengzhen Li, Shenzhen (CN); Juan Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 314 days.

(21) Appl. No.: 18/735,684

(22) Filed: Jun. 6, 2024

(65) Prior Publication Data

US 2025/0380236 A1 Dec. 11, 2025

Related U.S. Application Data

(63) Continuation of application No. PCT/CN2022/106067, filed on Jul. 15, 2022.

(51) Int. Cl.
*H04W 64/00* (2009.01)
*H04B 17/318* (2015.01)
*H04L 5/00* (2006.01)
*H04W 72/20* (2023.01)

(52) U.S. Cl.
CPC .......... *H04W 64/00* (2013.01); *H04B 17/328* (2023.05); *H04L 5/0051* (2013.01); *H04W 72/20* (2023.01)

(58) Field of Classification Search
CPC ..... H04W 64/00; H04W 72/20; H04W 92/18; H04W 8/24; H04W 24/08; H04W 72/25; H04B 17/328; H04L 5/0051; H04L 5/0048; G01S 5/0072
See application file for complete search history.

(56) References Cited

U.S. PATENT DOCUMENTS

2021/0314907 A1 10/2021 Gunnarsson et al.
2022/0303955 A1* 9/2022 He ........................ H04L 5/0055
2022/0361137 A1* 11/2022 Baek ..................... G01S 5/0072

FOREIGN PATENT DOCUMENTS

CN 114175819 A 3/2022
WO WO-2021/242695 A1 12/2021
WO WO-2022/010910 A1 1/2022

OTHER PUBLICATIONS

Extended European Search Report for EP Appl. No. 22950731.4, dated Feb. 19, 2025 (9 pages).
International Search Report and Written Opinion for PCT Appl. No. PCT/CN2022/106067 mailed Nov. 25, 2022, (8 pages).
Communication pursuant to Article 94(3) EPC for EP Appl. No. 22950731.4, dated Oct. 21, 2025 (6 pages).

* cited by examiner

*Primary Examiner* — Charles N Appiah
*Assistant Examiner* — Frank E Donado
(74) *Attorney, Agent, or Firm* — Foley & Lardner LLP

(57) ABSTRACT

Systems and methods for wireless communication systems are disclosed. In one aspect, the wireless communication method includes determining, by a first wireless communication device in a sidelink communication, a position of the first wireless communication device based on positioning-related information. The positioning-related information includes at least one of the following: control information, a second wireless communication device in the sidelink communication, or a plurality of reference signals.

19 Claims, 11 Drawing Sheets

300

400

900

1000

1100

1200

1300

SYSTEMS AND METHODS FOR SIDELINK POSITIONING

CROSS-REFERENCE TO RELATED APPLICATION

This application claims the benefit of priority under 35 U.S.C. § 120 as a continuation of PCT Patent Application No. PCT/CN2022/106067, filed on Jul. 15, 2022, the disclosure of which is incorporated herein by reference in its entirety.

TECHNICAL FIELD

The disclosure relates generally to wireless communication, including but not limited to systems and methods of improving accuracy of sidelink positioning.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

One aspect is a wireless communication method, including: determining, by a first wireless communication device in a sidelink communication, a position of the first wireless communication device based on positioning-related information. The positioning-related information includes at least one of the following: control information, a second wireless communication device in the sidelink communication, or a plurality of reference signals.

In some arrangements, the method further includes receiving, by the first wireless communication device from the second wireless communication device, the control information. The control information includes at least two sets, each of the sets indicates a respective cast type and a respective destination identification, and wherein one of the sets is associated with a data signal, and the other of the sets is associated with a first one of the reference signals.

In some arrangements, the two sets are configured independently from each other.

In some arrangements, the method further includes upon identifying the destination identification associated with the first reference signal, determining, by the first wireless communication device, whether to receive the first reference signal.

In some arrangements, the method further includes selecting, by the first wireless communication device, the second wireless communication device from a plurality of wireless communication devices in the sidelink communication based on a location uncertainty associated with the second wireless communication device.

In some arrangements, the method further includes sending, by the first wireless communication device to each of the plurality of wireless communication devices, a first message including a capability request, and receiving, by the first wireless communication device from the second wireless communication device, a second message responsive to the first message and indicating that the second wireless communication device has a positioning capability so as to select the second wireless communication device.

In some arrangements, the method further includes sending, by the first wireless communication device to each of the plurality of wireless communication devices, a first message requesting location information and location uncertainty information, receiving, by the first wireless communication device from each of the plurality of wireless communication devices, a second message responsive to the first message and indicating a respective location and respective location uncertainty of each the plurality of wireless communication devices, and selecting, by the first wireless communication device, the second wireless communication device in response to determining that the location uncertainty of the second wireless communication device satisfies a threshold.

In some arrangements, the location uncertainty is related to a distance between the first wireless communication device and the second wireless communication device.

In some arrangements, the location uncertainty is related to a pathloss parameter.

In some arrangements, the location uncertainty is related to a transmission power.

In some arrangements, the method further includes selecting, by the first wireless communication device, the second wireless communication device from a plurality of wireless communication devices in the sidelink communication based on a reference signal received power (RSRP) measurement associated with the second wireless communication device.

In some arrangements, the method further includes sending, by the first wireless communication device to each of the plurality of wireless communication devices, a first message including a second one of the reference signals, sending, by the first wireless communication device to each of the plurality of wireless communication devices, a second message requesting to measure an RSRP of the corresponding second reference signal, receiving, by the first wireless communication device from each of the plurality of wireless communication devices, a third message responsive to the second message and including an RSRP measurement report on the second reference signal, and selecting, by the first wireless communication device, the second wireless communication device in response to determining that the RSRP measurement report associated with the second wireless communication device satisfies a threshold.

In some arrangements, the method further includes receiving, by the first wireless communication device from each of the plurality of wireless communication devices, a first message including a second reference signal, measuring, by the first wireless communication device, an RSRP on the second reference signal received from each of the plurality of wireless communication devices, and selecting, by the first wireless communication device, the second wireless communication device in response to determining that the measured RSRP associated with the second wireless communication device satisfies a threshold.

In some arrangements, the method further includes receiving, by the first wireless communication device from each of a plurality of wireless communication devices in the sidelink communication, a first message including a second one of the reference signals, measuring, by the first wireless communication device, within a time window, an RSRP on the second reference signal received from each of the plurality of wireless communication devices, and selecting, by the first wireless communication device, the second wireless communication device from the plurality of wireless communication devices in response to determining that the measured RSRP associated with the second wireless communication device satisfies a threshold.

In some arrangements, the time window is configured prior to a timing that the first wireless communication device sends a location request to the second wireless communication device.

In some arrangements, the method further includes determining, by the first wireless communication device, a first distance from the second wireless communication device to the first wireless communication device, determining, by the first wireless communication device, a second distance from a wireless communication node to the first wireless communication device, and determining, by the first wireless communication device, the position based on the first distance and the second distance.

In some arrangements, the first distance is determined based on a first timing when the first wireless communication device sends a first one of the references signals to the second wireless communication device, a second timing when the second wireless communication device receives the first reference signal, a third timing when the second wireless communication device sends a second one of the references signals to the first wireless communication device, and a fourth timing when the first wireless communication device receives the second reference signal.

In some arrangements, the second distance is determined based on the first timing, the second timing, a fifth timing when the wireless communication node sends a third one of the reference signals, and a sixth timing when the first wireless communication device receives the third reference signal.

In some arrangements, the method further includes receiving, by the first wireless communication device, a location measurement request from a second wireless communication device, which received the location measurement request from a location server, and transmitting, by the first wireless communication device, a location measurement report to the second wireless communication device configured to transmit the location measurement report to the location server.

Another aspect is a wireless communications apparatus including a processor and a memory, wherein the processor is configured to read code from the memory and implement a method recited in any of the above arrangements.

Another aspect is a computer program product including a computer-readable program medium code stored thereupon, the code, when executed by a processor, causing the processor to implement a method recited in any of the above arrangements.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
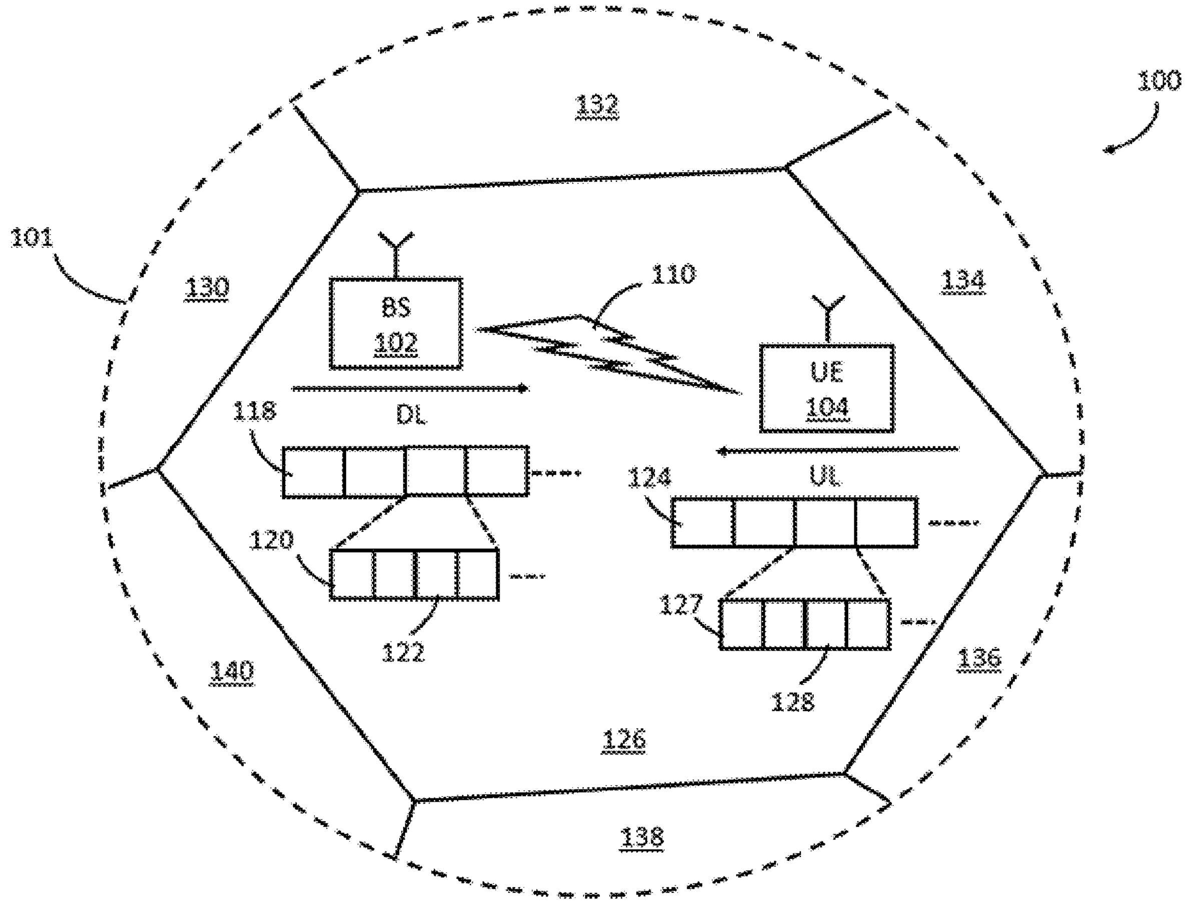
FIG. 1 illustrates an example wireless communication system in which techniques disclosed herein can be implemented, in accordance with some arrangements of the present disclosure.

FIG. 1 illustrates an example wireless communication system 100 in which techniques disclosed herein can be implemented, in accordance with some arrangements of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a location management function (LMF)). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
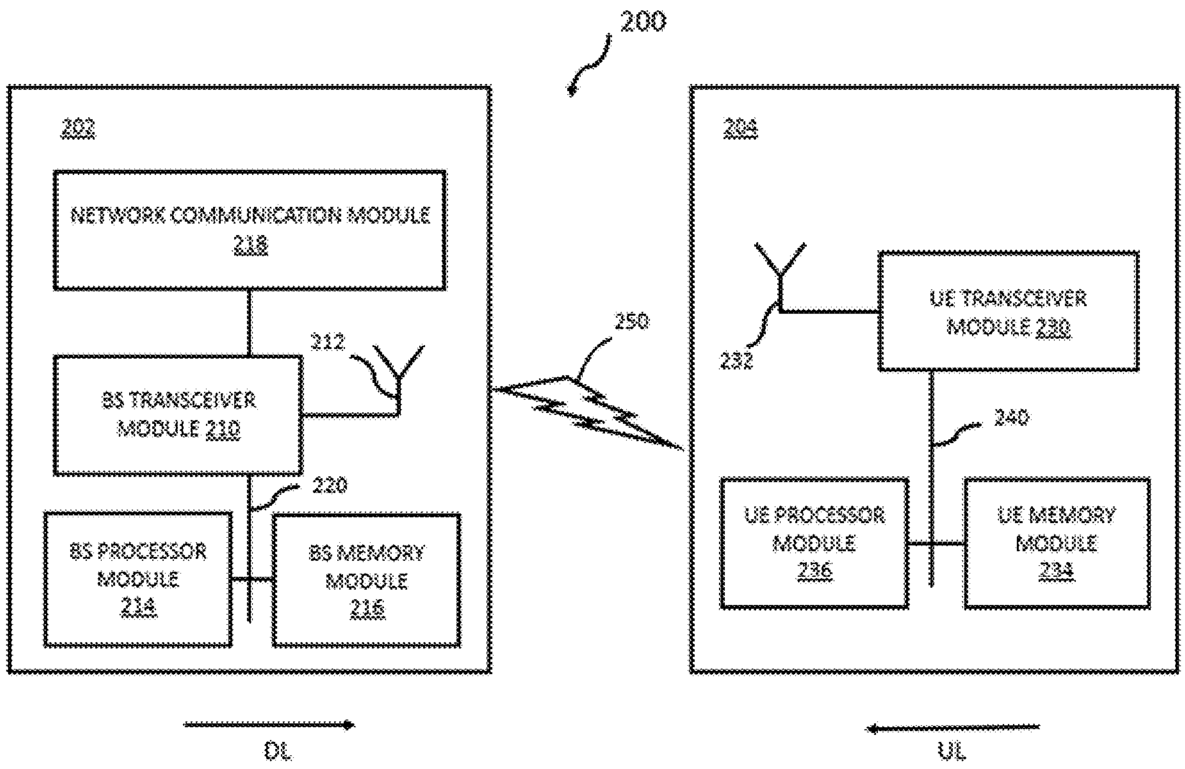
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals), in accordance with some arrangements of the present disclosure.

FIG. 2 illustrates a block diagram of an example wireless communication system 200 for transmitting and receiving wireless communication signals (e.g., OFDM or OFDMA signals) in accordance with some arrangements of the present disclosure. The system 200 may include components and elements configured to support known or conventional operating features that need not be described in detail herein. In one illustrative arrangement, system 200 can be used to communicate (e.g., transmit and receive) data symbols in a wireless communication environment such as the system 100 of FIG. 1, as described above.

System 200 generally includes a base station 202 (hereinafter "BS 202") and a user equipment device 204 (hereinafter "UE 204"). The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some arrangements, the UE transceiver 230 may be referred to herein as an "uplink" transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some arrangements, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various arrangements, the BS 202 may be an evolved node B (eNB), a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some arrangements, a first layer may be a physical layer. In some arrangements, a second layer may be a MAC layer. In some arrangements, a third layer may be a Radio Link Control (RLC) layer. In some arrangements, a fourth layer may be a Packet Data Convergence Protocol (PDCP) layer. In some arrangements, a fifth layer may be a radio resource control (RRC) layer. In some arrangements, a sixth layer may be a Non Access Stratum (NAS) layer or an Internet Protocol (IP) layer, and the seventh layer being the other layer.

Accuracy Improvement of Sidelink Positioning

Positioning may be performed by a variety of methods including using an Uu interface based on downlink positioning reference signal (DL-PRS) and sounding reference signal (SRS). In sidelink positioning, sidelink positioning reference signal (SL-PRS) may be transmitted by anchor nodes to a target UE via a PC5 interface. However, how to design and configure the parameters of SL-PRS and how to select anchor nodes for absolute positioning and relative positioning can be challenging, as well as configuring the signaling interaction for sidelink positioning. Some embodiments of the present disclosure relate to parameter design, selection of anchor nodes and signaling interaction of sidelink positioning which can advantageously improve sidelink positioning accuracy.

Configuring the Destination Indicators of PSSCH and SL-PRS Separately

In sidelink positioning, a target UE to be located can transmit location requests to surrounding UEs. The surrounding UEs with location capability, called anchor UEs, can transmit SL-PRS to the target UE when they receive the location request from the target UE. To be flexible of transmission of physical sidelink shared channel (PSSCH) and SL-PRS, some embodiments can include configuring the destination indicators of PSSCH and SL-PRS separately. In sidelink control information (SCI), an anchor node can configure at least two sets. Each set includes a cast type indicator and a destination ID. One set is associated with data signal, while the other of the sets can be configured to indicate target UEs receiving SL-PRS.

The configuration of SL-PRS cast type indicator can be independent of the cast type indicator of PSSCH. The SL-PRS cast type indicator can be configured to be 1 bit, which indicates unicast and groupcast of SL-PRS. The SL-PRS destination ID can be independent of destination ID of PSSCH. If both of PSSCH and SL-PRS are transmitted in unicast, SL-PRS cast type indicator and cast type indicator of PSSCH can all indicate unicast. Then, the SL-PRS destination ID can be same as destination ID of PSSCH. If PSSCH is transmitted in unicast and SL-PRS is transmitted in groupcast, SL-PRS cast type indicator and cast type indicator of PSSCH can be different. Then, the SL-PRS destination ID can be different from destination ID of PSSCH. If both of PSSCH and SL-PRS are transmitted in groupcast, SL-PRS cast type indicator and cast type indicator of PSSCH can all indicate groupcast. Then, the SL-PRS destination ID can be the same as destination ID of PSSCH. If PSSCH is transmitted in broadcast, SL-PRS destination ID can be configured to be the same as destination ID of PSSCH.

The target UE can decode SCI, when the target UE receives the SCI. Then, based on the identified SL-PRS destination ID carried in the SCI, target UE can determine whether to receive the SL-PRS. If it is indicated by SL-PRS destination ID, target UE can receive the SL-PRS and measure so as to obtain the location measurements. If it is not indicated by the SL-PRS destination ID, the target UE may not receive the SL-PRS and obtain the measurements.

Using Location Uncertainty to Facilitate Sidelink Absolute Positioning

In partial coverage of sidelink positioning, the target UE can estimate its absolute location information based on anchor UEs. The location information of anchor UEs can be obtained based on other anchor UEs or base stations, where there is location uncertainty. The location uncertainty can be a metric which evaluates quality of location information. To improve positioning accuracy, location uncertainty to facilitate sidelink absolute positioning can be used.

In absolute positioning in partial coverage, the target UE can search surrounding UEs with positioning capability. In finding surrounding UEs with capability, the target UE can transmit the capability request to surrounding UEs. If surrounding UEs have the positioning capability, they can transmit capability response to the target UE. Otherwise, surrounding UEs may not respond to the target UE.

Figure 3:
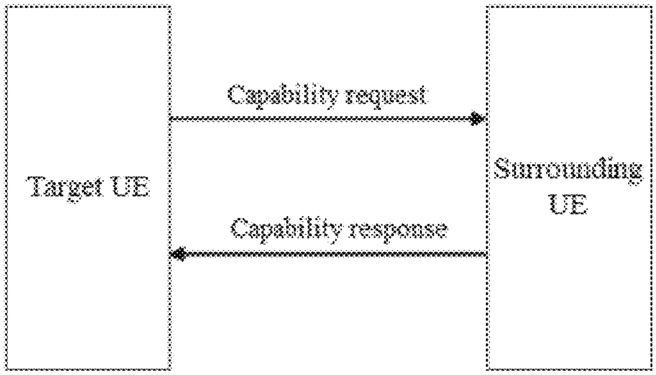
FIGS. 3 and 4 illustrate example processes of finding surrounding UEs with positioning capability, in accordance with some arrangements of the present disclosure.
Figure 4:
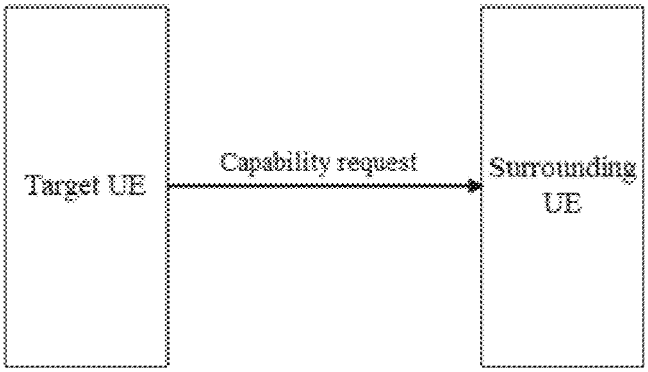

FIGS. 3 and 4 illustrate example processes 300 and 400, respectively, of finding surrounding UEs with positioning capability, in accordance with some arrangements of the present disclosure. FIG. 3 illustrates a successful operation of where the capability request is sent from the target UE to the surrounding UE, and a capability response is transmitted from the surrounding UE to the target UE. FIG. 4 illustrates a failed operation of where capability request is sent from the target UE to the surrounding UE, but no capability response is transmitted from the surrounding UE.

Figure 5:
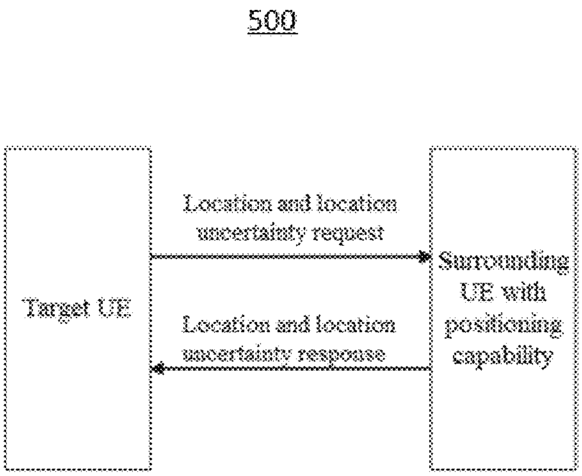
FIG. 5 illustrates an example process of transmitting the location and location uncertainty request and receiving the response, in accordance with some arrangements of the present disclosure.

FIG. 5 illustrates an example process 500 of transmitting the location and location uncertainty request and receiving the response, in accordance with some arrangements of the present disclosure. Additionally, the target UE can transmit location and location uncertainty request to surrounding UEs with positioning capability to obtain the location and location uncertainty of the surrounding UEs. When the surrounding UE receives the location and location uncertainty request, the surrounding UE can transmit the location and location uncertainty response to the target UE, so as to provide its location information and location uncertainty.

Based on these received location and location uncertainty, the target UE can select the surrounding UEs satisfying some conditions as anchor nodes. For example, surrounding UEs with less location uncertainty can be selected as anchor nodes. For example, the target UE can pre-configure a location uncertainty threshold. Surrounding UEs with location uncertainty less than the location uncertainty threshold can be selected as anchor nodes.

Figure 6:
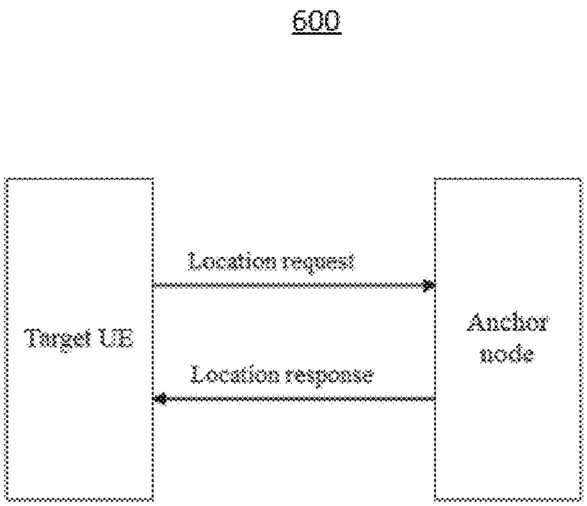
FIG. 6 illustrates an example process of the target UE transmitting the location request to anchor nodes and receiving the response, in accordance with some arrangements of the present disclosure.

FIG. 6 illustrates an example process 600 of the target UE transmitting the location request to anchor nodes and receiving the response, in accordance with some arrangements of the present disclosure. The anchor nodes can transmit the location response and SL-PRS to the target UE. Based on SL-PRS, the target UE can obtain the location measurement by, e.g., RSRP, reference signal time difference (RSTD), angle of arrival (AOA), or angle of departure (AOD).

Figure 7:
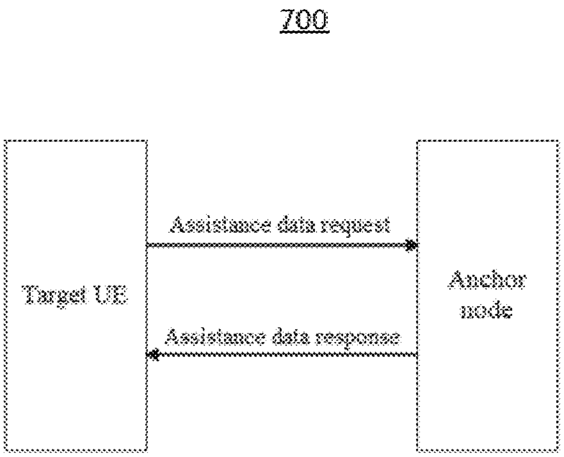
FIG. 7 illustrates an example process of the target UE sending an assistance data request and receiving the response, in accordance with some arrangements of the present disclosure.

FIG. 7 illustrates an example process 700 of the target UE sending an assistance data request and receiving the response, in accordance with some arrangements of the present disclosure. If the target UE is capable of calculation, the target UE can calculate its own location estimation and location uncertainty. Therefore, target UE can request the associated assistance data of anchor nodes. In the procedure of obtaining assistance data, target UE transmits assistance data can request to anchor node. Then, anchor node can transmit assistance data response when it receives assistance data request.

Figure 8:
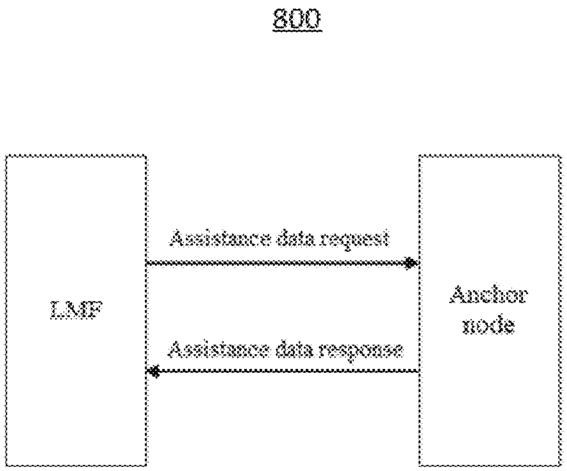
FIGS. 8 and 9 illustrate example processes of the LMF interacting with the anchor node and the target UE, in accordance with some arrangements of the present disclosure.
Figure 9:
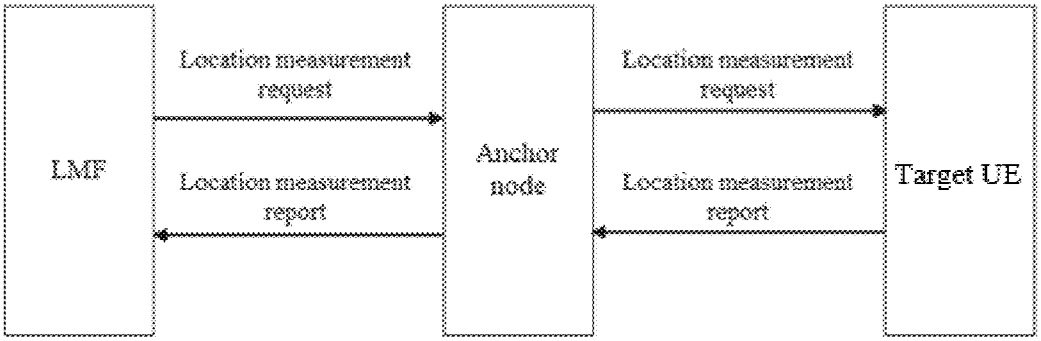

FIGS. 8 and 9 illustrate example processes 800 and 900, respectively, of the LMF interacting with the anchor node and the target UE, in accordance with some arrangements of the present disclosure. If location estimation of target UE is calculated at an LMF, the LMF may request the location measurements and assistance data. In the procedure of obtaining assistance data of example process 800, the LMF transmits assistance data request to the anchor UE. And the anchor UE transmits assistance data response to the LMF when it receives assistance data request. In the procedure of obtaining location measurements of example process 900, the LMF transmits location measurement request to the anchor node. The anchor node transmits the location measurement request to the target UE when it receive location measurement request of LMF. Then, the target UE transmits the location measurement report to the anchor node, and the anchor node transmits location measurement report to the LMF.

Using Distance Between the Anchor Node and the Target UE

The location uncertainty can be related to the distance between the anchor node and the target UE. For a target UE, if it is assumed that the location information and location uncertainty of its anchor node are known, by receiving and measuring SL-PRS transmitted from ith anchor node, target UE can obtain the transmission time $\tau_i$ between ith anchor node and target UE. The ith transmission time $\tau_i$ corresponds to a transmission time uncertainty $$u_i^T.$$

The transmission time uncertainty $$u_i^T$$

can be defined as $$u_i^T = m_i \cdot T_s,$$

where $T_s$=1/(15000×2048) is the scaling factor, $m_i$ is related to distance between ith anchor node and target UE. The larger distance between ith anchor node and target UE is, the larger $m_i$ is. For example, the value of $m_i$ can be given as following table:

| Distance between ith anchor node and target UE | $m_i$ |
|---|---|
| <=10 m | 1 |
| >10 m, <=20 m | 2 |
| >20 m, <=30 m | 3 |
| >30 m, <=40 m | 4 |
| >40 m, <=50 m | 5 |
| >50 m, <=60 m | 6 |
| >60 m, <=70 m | 7 |
| >70 m | 8 |

Then, the location estimation uncertainty u; of target UE resulted from ith anchor node can be defined as $$u_i = u_i^T \cdot c,$$

where c is the speed of light. Therefore, the location estimation uncertainty u of target UE resulted from all the anchor node can be defined as the weighted sum of $u_i$, that is $u=w_1u_1+w_2u_2+\ldots$, where ($w_1$, $w_2$, . . . ) is the weight of the corresponding ($u_1$, $u_2$, . . . ) which is configured by the target UE. ($w_1$, $w_2$, . . . ) is related to the location uncertainty of the anchor node. The larger location uncertainty of the ith anchor node is, the less $w_i$ is. For example, when all the weight are equal, the weighted sum of $(u_1, u_2, \ldots)$ simplifies to the mean of $(u_1, u_2, \ldots)$, that is $u=\text{mean}(u_1, u_2, \ldots)$.

Then, after the target UE obtains its location estimation and location estimation uncertainty, it can be an anchor node of other neighbor target UEs, and it can provide its location estimation and location estimation uncertainty as location information and location uncertainty of an anchor node to other neighbor target UEs.

Alternatively, the location uncertainty also can be related to pathloss. The larger pathloss is, the larger the location uncertainty is.

Alternatively, the location uncertainty also can be related to transmission power. The larger transmission power is, the less the location uncertainty is.

Surrounding UEs are Selected as Anchor Nodes

In relative positioning in sidelink positioning, to improve the relative positioning accuracy, surrounding UEs within X meters of target UE can be selected as anchor nodes. For the selection of anchor nodes, the RSRP can be measured.

Figure 10:
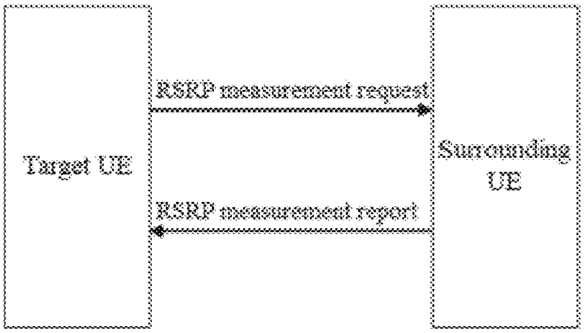
FIG. 10 illustrates an example process of an RSRP measurement request and response, in accordance with some arrangements of the present disclosure.

FIG. 10 illustrates an example process of an RSRP measurement request and response, in accordance with some arrangements of the present disclosure. The target UE can transmit a reference signal, e.g., demodulation reference signal (DMRS), sidelink-synchronization signal/physical sidelink broadcast channel (S-SS/PSBCH), to surrounding UEs. The RSRP measurement request can be transmitted to surrounding UEs from target UE. Surrounding UEs can measure the RSRP of the reference signal received from target UE when they receive RSRP measurement request. Then, the surrounding UEs can transmit an RSRP measurement report to target UE.

The target UE can pre-configure a RSRP threshold, where the RSRP threshold is related to the distance between target UE and surrounding UE. When the target UE receives RSRP measurements from surrounding UEs, the target UE can compare RSRP measurements with the RSRP threshold. The surrounding UEs with RSRP measurement larger than RSRP threshold can be selected as anchor nodes.

In some embodiments, surrounding UEs can communicate with the target UE. Then, the target UE measures the RSRP of the reference signal transmitted from the surrounding UEs to the target UE. The RSRP measured by the target UE can be compared to the RSRP threshold, which can be pre-configured by target UE. The surrounding UEs with RSRP measurement larger than RSRP threshold can be selected as anchor nodes.

In some embodiments, a broadcast signal can be transmitted by surrounding UEs, and its RSRP can be measured by the target UE. Then, the RSRP measurement can be compared to the RSRP threshold, which is pre-configured by the target UE. The surrounding UEs with RSRP measurement larger than RSRP threshold can be selected as anchor nodes.

Setting a Time Window and Measure RSRP

Figure 11:
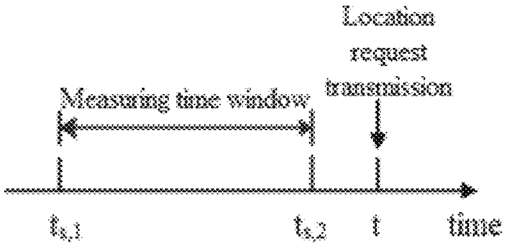
FIG. 11 illustrates the measuring time window, in accordance with some arrangements of the present disclosure.

In terms of determination of anchor nodes in relative positioning, a time window can be set and the RSRP can be measured. The target UE can transmit location request to anchor nodes at time t. A measuring time window can be set from time $t-t_{s,1}$ to time $t-t_{s,2}$, where $t_{s,1}$ and $t_{s,2}$ are positive integers. FIG. 11 illustrates the measuring time window, in accordance with some arrangements of the present disclosure. In the measuring time window, the target UE can measure the RSRP of signal, e.g., S-SS/PSBCH, DMRS, transmitted from surrounding UEs. A RSRP threshold can be pre-configured by the target UE. Then, the RSRP measured in measuring time window can be compared to the RSRP threshold. Surrounding UEs with RSRP larger than RSRP threshold can be selected as anchor nodes. And the target UE can transmit location request to these selected anchor nodes at time t.

If there are multiple signals from one surrounding UE in measuring time window, the RSRP can be calculated to be the average value of the multiple signals RSRPs.

In some embodiments, if there are multiple signals from one surrounding UE in measuring time window, the RSRP can be obtained to be the maximum RSRP value of multiple signal RSRPs.

In some embodiments, if there are no signals from any surrounding UEs in the measuring time window, the target UE can transmit a reference signal, e.g. DMRS, S-SS/PSBCH, to surrounding UEs at time $t_{s,2}$. The RSRP measurement request can be transmitted to surrounding UEs from the target UE at time $t_{s,2}$. Surrounding UEs can measure the RSRP of reference signal received from target UE when they receive RSRP measurement request. Then, surrounding UEs can transmit the RSRP measurement report to target UE. When the target UE receives RSRP measurements from the surrounding UEs, the target UE can compare the RSRP measurements to the RSRP threshold. The surrounding UEs with RSRP measurement larger than RSRP threshold can be selected as anchor nodes.

Using LMF to Estimate Location of Target UE

In some sidelink scenarios that target UE is in uplink (UL)-limited with DL being in-coverage, the target UE can receive DL-PRS, but the SRS may be limited. In this scenario, the BS can be an anchor node to assist estimating the location information of target UE. To calculate the location estimation of target UE, indirect round trip time (RTT) technique is employed.

Figure 12:
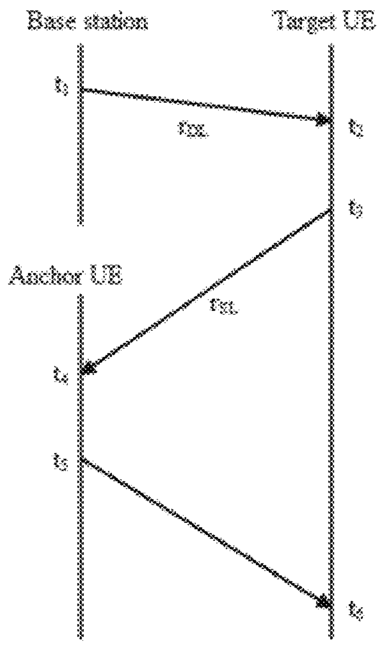
FIG. 12 illustrates SL-PRS and SL-PRS transmissions, in accordance with some arrangements of the present disclosure.

FIG. 12 illustrates SL-PRS and SL-PRS transmissions, in accordance with some arrangements of the present disclosure. To estimate the distance between target UE and BS, the target UE can transmit the location request to the BS, and the BS can transmit the DL-PRS to the target UE at time t1. The target UE can receive DL-PRS at time t2, and transmit the SL-PRS to the anchor UE at time t3. The anchor UE can receive the SL-PRS from target UE at time t4, and transmit SL-PRS to the target UE at time t5. The target UE can receive the SL-PRS from the anchor UE at time t6.

Then, the RTT algorithm can be used to calculate distance between target UE and anchor UE, that is $$r_{SL} = \frac{(t_6 - t_3) - (t_5 - t_4)}{2} \cdot c.$$

The distance between base station and target UE can be calculated as following: $r_{DL}=[(t_4-t_1)-(t_3-t_2)]\cdot c-r_{SL}$.

Thus, the location estimation of target UE can be calculated by combination at least two BSs and one anchor UE. Or, the location estimation of target UE can also be calculated by combination at least one BS and two anchor UEs. In the procedure of estimating distance between target UE and BS, the BS and anchor UE can be synchronized. A synchronization technique can be used to allow synchronization between the BS and the anchor UE.

In a UE-based case, the location estimation of target UE can be calculated by the target UE. In this case, assistance data of the BS can be transmitted to the LMF by NR Positioning Protocol A (NRPPa) packet data unit (PDU), and then the LMF can transmit assistance data of BS to the target UE by LTE positioning protocol (LPP) PDU. If the assistance data of the anchor UE is configured by anchor UE, the assistance data can be transmitted to the target UE by a PC5 interface. If assistance data of anchor UE is configured by the LMF, the assistance data can be transmitted to the target UE based on LPP PDU. Then, based on location measurements and assistance data of DL and SL, the target UE can calculate its own location estimation.

Figure 13:
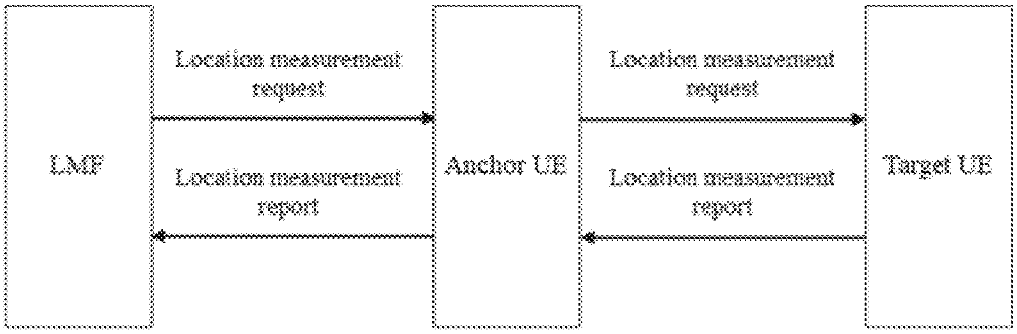
FIG. 13 illustrates an example process of an LMF-based location measurement, in accordance with some arrangements of the present disclosure.

FIG. 13 illustrates an example process 1400 of an LMF-based location measurement, in accordance with some arrangements of the present disclosure. In an LMF-based case, the location estimation of target UE can be calculated by the LMF. In this case, assistance data of BS can be transmitted to the LMF by NRPPa PDU. If the assistance data of the anchor UE is configured by the anchor UE, it is transmitted to LMF by LPP PDU. For location measurements measured by target UE, the LMF can transmit location measurement request to anchor UE. Then, anchor UE can transmit the location measurement request to the target UE. When the target UE receives location measurement request, the target UE can transmit location measurement report to anchor UE. Then, anchor UE can transmit the location measurement report to LMF.

In some embodiments, at least two cast type indicators and destination IDs in SCI can be configured and indicate PSSCH and SL-PRS separately. This can be flexible for transmission of PSSCH and SL-PRS.

In some embodiments, location uncertainty is used to facilitate improvement of positioning accuracy in absolute positioning case in partial coverage. Base on received location and location uncertainty, the target UE can select the surrounding UEs satisfying some conditions as anchor nodes. Then, the selected anchor nodes can be used to transmit SL-PRS.

In some embodiments, the location uncertainty can be defined. Location uncertainty can be defined to be related to distance between anchor node and target UE. Alternatively, location uncertainty can be related to pathloss. Alternatively, location uncertainty can be related to transmission power.

In some embodiments, anchor nodes for relative positioning based on RSRP can be selected. The RSRP of reference signal can be measured by target UE or surrounding UE, and it can be compared to the pre-configured RSRP threshold. The surrounding UEs with RSRP larger than RSRP threshold can be selected as anchor nodes.

In some embodiments, a measuring time window can be set and the RSRP of reference signal in measuring time window can be measured. The surrounding UEs with RSRP larger than RSRP threshold can be selected as anchor nodes for relative positioning.

In some embodiments, signaling interaction can be introduced in the scenario that target UE is in UL-limited with DL being in-coverage.

Figure 14:
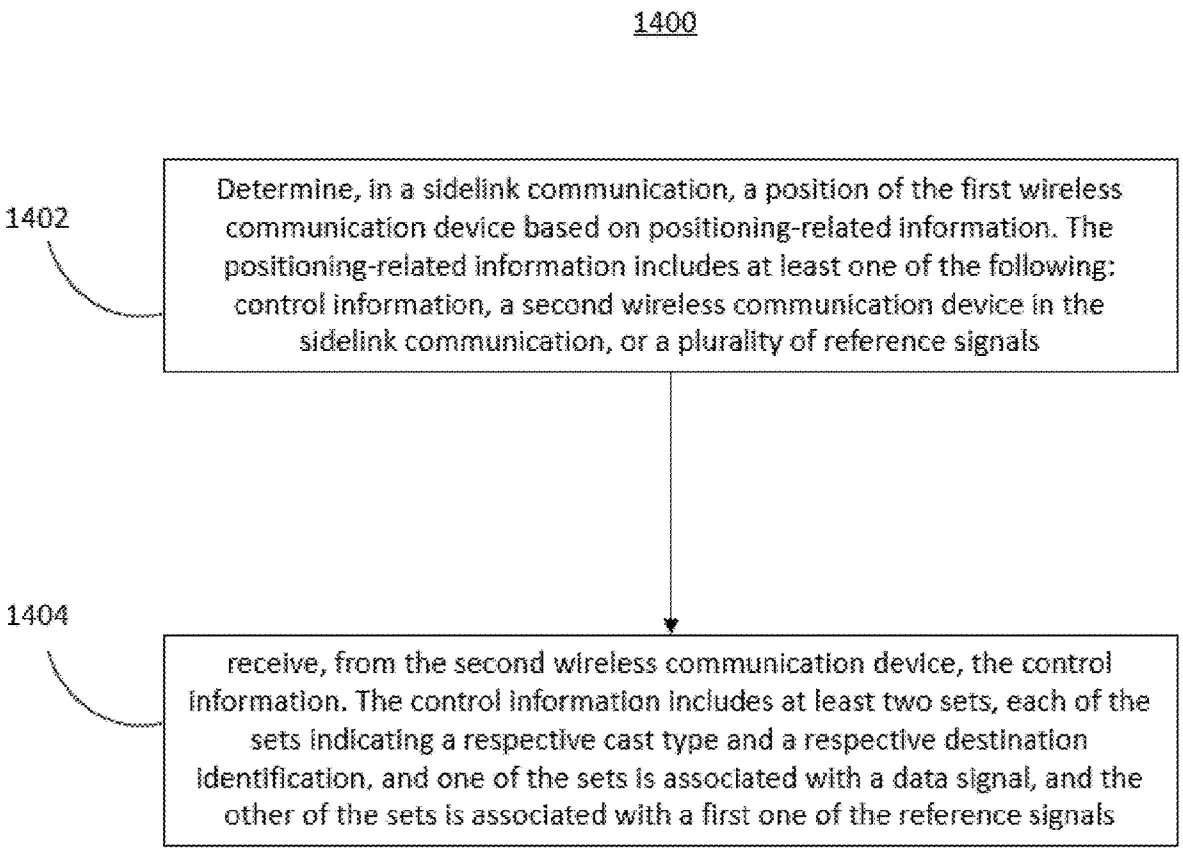
FIGS. 14, 15, 16, 17, and 18 illustrate flow charts of example wireless communication processes, in accordance with some arrangements of the present disclosure.

FIG. 14 illustrates a flow chart of an example wireless communication process 1400 according to some arrangements. The process 1400 is performed by the UE (e.g., target UE). The process 1400 includes determining, in a sidelink communication, a position of the first wireless communication device based on positioning-related information (1402). The positioning-related information includes at least one of the following: control information, a second wireless communication device in the sidelink communication, or a plurality of reference signals. The process 1400 can include receiving, from the second wireless communication device, the control information (1404). The control information includes at least two sets, each of the sets indicating a respective cast type and a respective destination identification, and one of the sets is associated with a data signal, and the other of the sets is associated with a first one of the reference signals.

Figure 15:
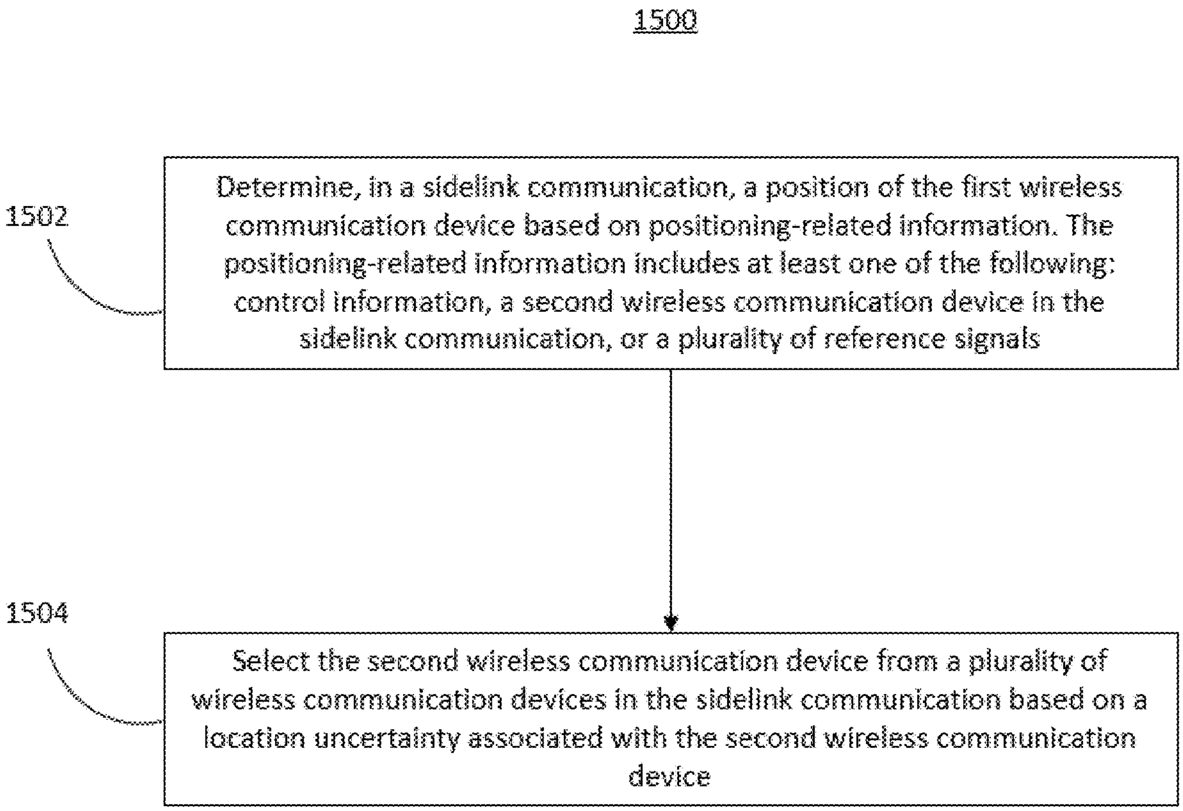

FIG. 15 illustrates a flow chart of an example wireless communication process 1500 according to some arrangements. The process 1500 is performed by the UE (e.g., target UE). The process 1500 includes determining, in a sidelink communication, a position of the first wireless communication device based on positioning-related information (1502). The positioning-related information includes at least one of the following: control information, a second wireless communication device in the sidelink communication, or a plurality of reference signals. The process 1500 can include selecting the second wireless communication device from a plurality of wireless communication devices in the sidelink communication based on a location uncertainty associated with the second wireless communication device (1504).

Figure 16:
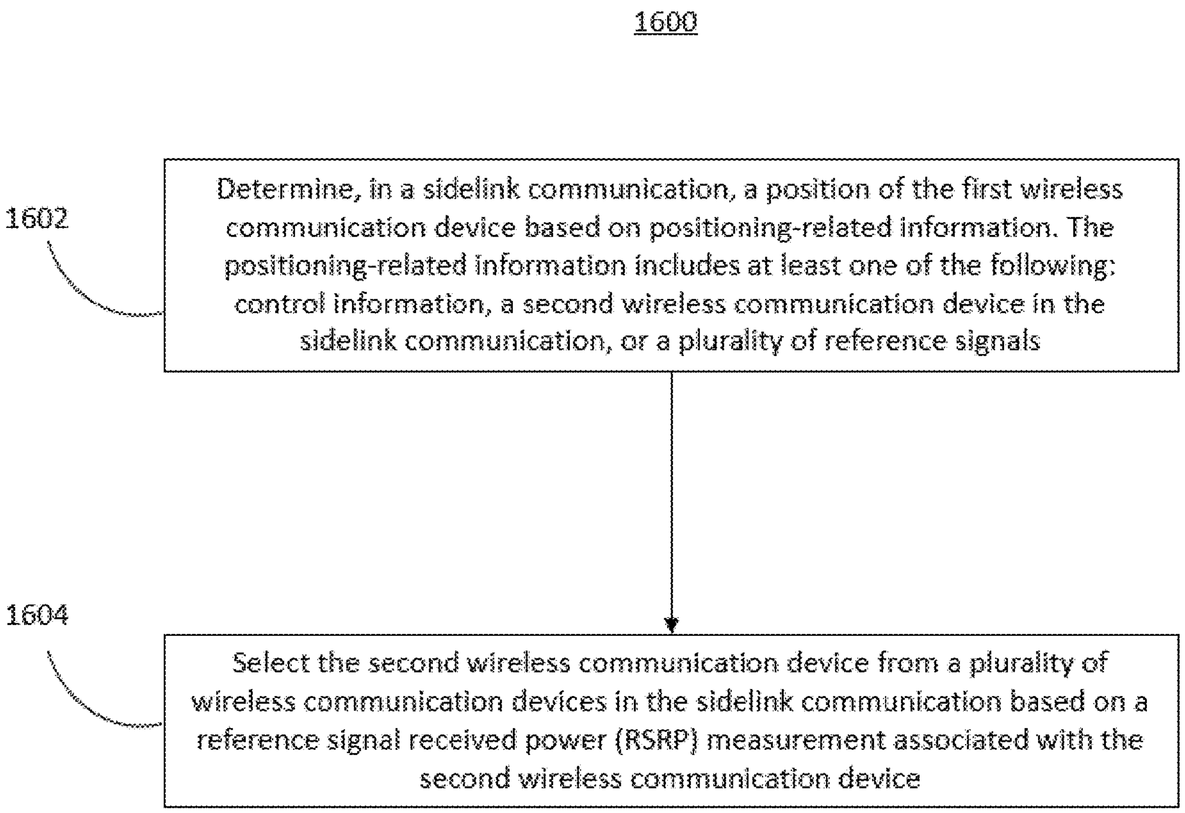

FIG. 16 illustrates a flow chart of an example wireless communication process 1600 according to some arrangements. The process 1600 is performed by the UE (e.g., target UE). The process 1600 includes determining, in a sidelink communication, a position of the first wireless communication device based on positioning-related information (1602). The positioning-related information includes at least one of the following: control information, a second wireless communication device in the sidelink communication, or a plurality of reference signals. The process 1600 can include selecting the second wireless communication device from a plurality of wireless communication devices in the sidelink communication based on a RSRP measurement associated with the second wireless communication device (1604).

Figure 17:
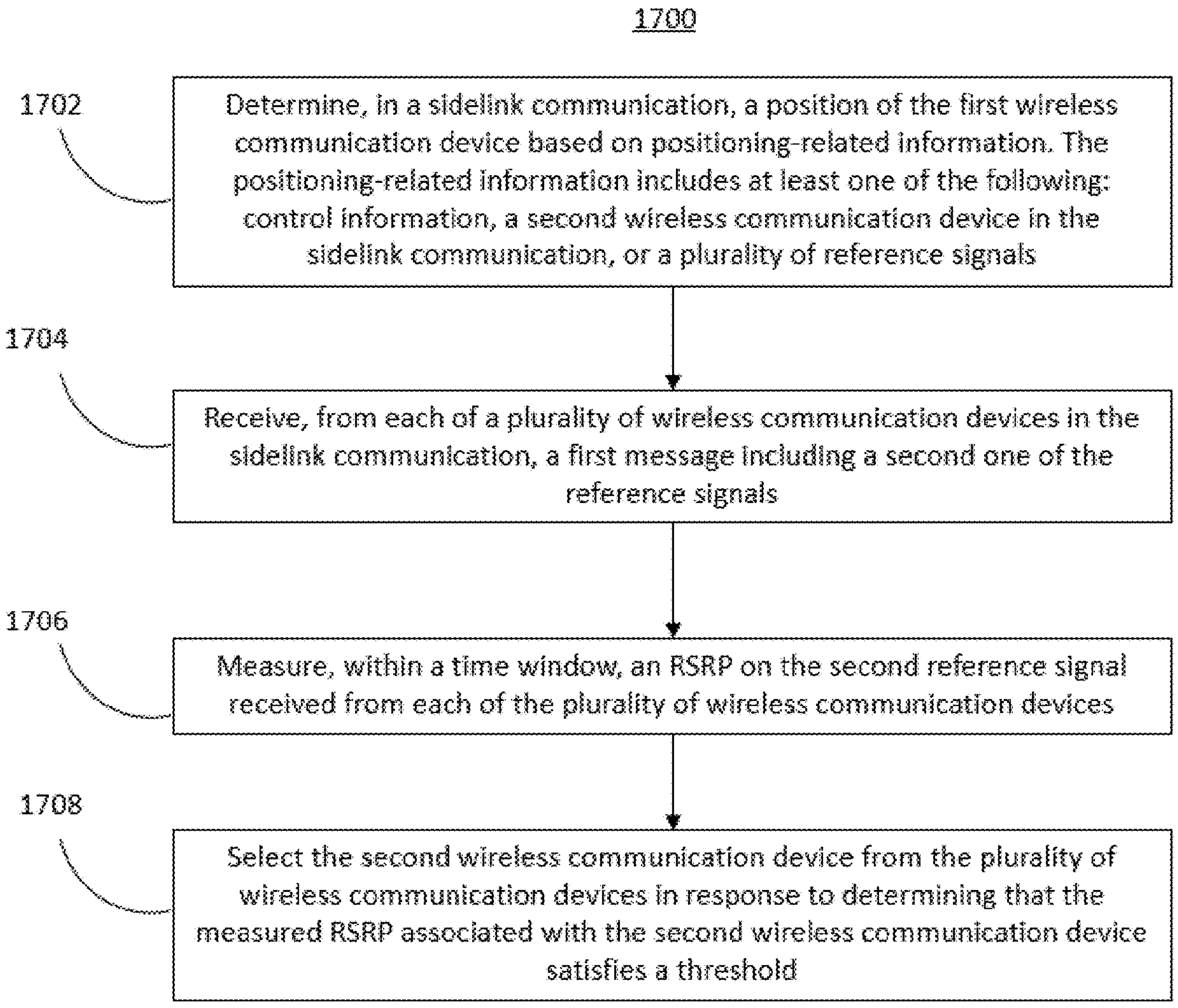

FIG. 17 illustrates a flow chart of an example wireless communication process 1700 according to some arrangements. The process 1700 is performed by the UE (e.g., target UE). The process 1700 includes determining, in a sidelink communication, a position of the first wireless communication device based on positioning-related information (1702). The positioning-related information includes at least one of the following: control information, a second wireless communication device in the sidelink communication, or a plurality of reference signals. The process 1700 can include receiving, from each of a plurality of wireless communication devices in the sidelink communication, a first message including a second one of the reference signals (1704). The process 1700 can include measuring, within a time window, an RSRP on the second reference signal received from each of the plurality of wireless communication devices (1706). The process 1700 can include selecting the second wireless communication device from the plurality of wireless communication devices in response to determining that the measured RSRP associated with the second wireless communication device satisfies a threshold (1708).

Figure 18:
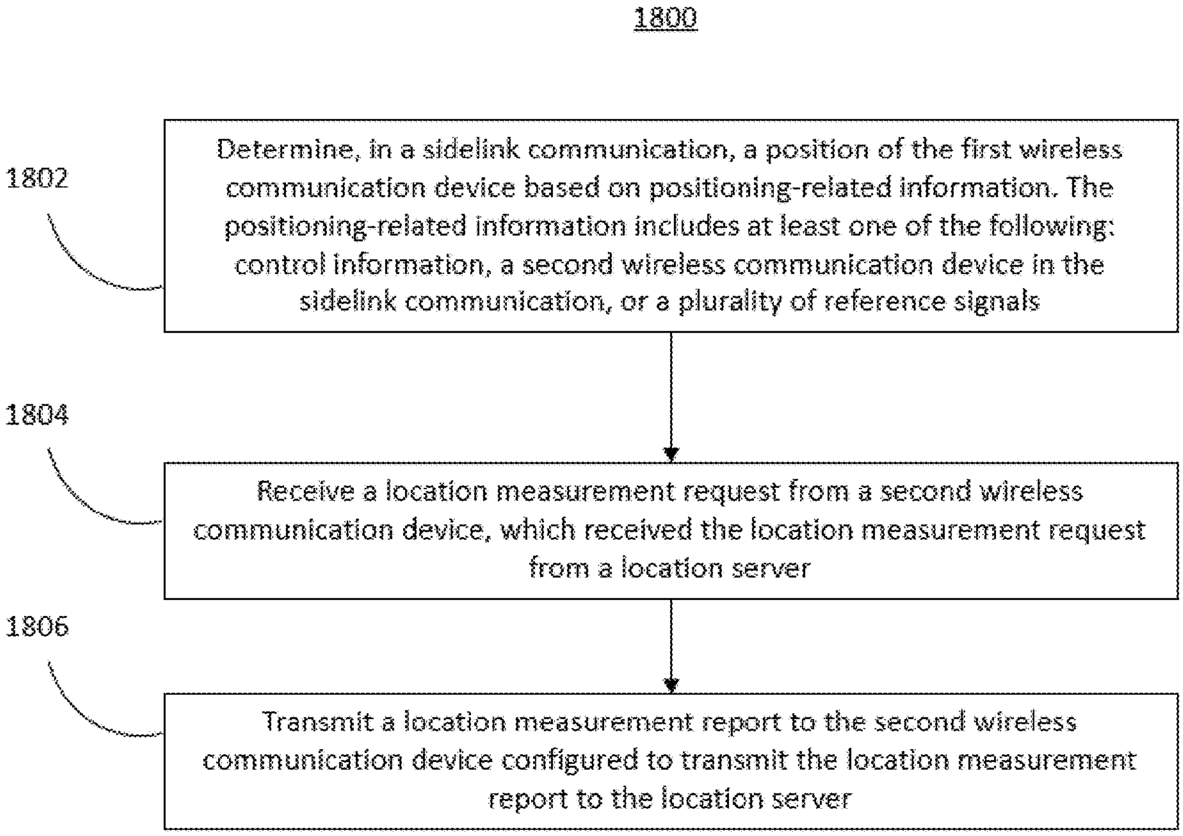

FIG. 18 illustrates a flow chart of an example wireless communication process 1800 according to some arrangements. The process 1800 is performed by the UE (e.g., target UE). The process 1800 includes determining, in a sidelink communication, a position of the first wireless communication device based on positioning-related information (1802). The positioning-related information includes at least one of the following: control information, a second wireless communication device in the sidelink communication, or a plurality of reference signals. The process 1800 can include receiving a location measurement request from a second wireless communication device, which received the location measurement request from a location server (1804). The process 1800 can include transmitting a location measurement report to the second wireless communication device configured to transmit the location measurement report to the location server (1806).

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the arrangements described in this disclosure will be readily apparent to those skilled in the art, and the general principles defined herein can be applied to other arrangements without departing from the scope of this disclosure. Thus, the disclosure is not intended to be limited to the arrangements shown herein, but is to be accorded the widest scope consistent with the novel features and principles disclosed herein, as recited in the claims below.

What is claimed is:

1. A wireless communication method, comprising:

receiving, by a first wireless communication device from a second wireless communication device via a sidelink communication, control information including a first one of a plurality of reference signals; and determining, by the first wireless communication device, a position of the first wireless communication device based on the first one of the plurality of reference signals included in the control information, wherein the control information includes at least two sets;

wherein each of the sets indicates a respective cast type and a respective destination identification, wherein the cast type of one of the sets is indicated by a sidelink channel, and the cast type of other of the sets is indicated by the first one of the plurality of reference signals.

2. The wireless communication method of claim 1, wherein the two sets are configured independently from each other.

3. The wireless communication method of claim 1, further comprising:

upon identifying the destination identification associated with the first reference signal, determining, by the first wireless communication device, whether to receive the first reference signal.

4. The wireless communication method of claim 1, further comprising:

selecting, by the first wireless communication device, the second wireless communication device from a plurality of wireless communication devices in the sidelink communication based on a location uncertainty associated with the second wireless communication device.

5. The wireless communication method of claim 4, further comprising:

sending, by the first wireless communication device to each of the plurality of wireless communication devices, a first message including a capability request; and receiving, by the first wireless communication device from the second wireless communication device, a second message responsive to the first message and indicating that the second wireless communication device has a positioning capability so as to select the second wireless communication device.

6. The wireless communication method of claim 4, further comprising:

sending, by the first wireless communication device to each of the plurality of wireless communication devices, a first message requesting location information and location uncertainty information;

receiving, by the first wireless communication device from each of the plurality of wireless communication devices, a second message responsive to the first message and indicating a respective location and respective location uncertainty of each the plurality of wireless communication devices; and selecting, by the first wireless communication device, the second wireless communication device in response to determining that the location uncertainty of the second wireless communication device satisfies a threshold.

7. The wireless communication method of claim 4, wherein the location uncertainty is related to a distance between the first wireless communication device and the second wireless communication device.

8. The wireless communication method of claim 4, wherein the location uncertainty is related to a pathloss parameter.

9. The wireless communication method of claim 4, wherein the location uncertainty is related to a transmission power.

10. The wireless communication method of claim 1, further comprising:

selecting, by the first wireless communication device, the second wireless communication device from a plurality of wireless communication devices in the sidelink communication based on a reference signal received power (RSRP) measurement associated with the second wireless communication device.

11. The wireless communication method of claim 10, further comprising:

sending, by the first wireless communication device to each of the plurality of wireless communication devices, a first message including a second one of the reference signals;

sending, by the first wireless communication device to each of the plurality of wireless communication devices, a second message requesting to measure an RSRP of the corresponding second reference signal;

receiving, by the first wireless communication device from each of the plurality of wireless communication devices, a third message responsive to the second message and including an RSRP measurement report on the second reference signal; and selecting, by the first wireless communication device, the second wireless communication device in response to determining that the RSRP measurement report associated with the second wireless communication device satisfies a threshold.

12. The wireless communication method of claim 10, further comprising:

receiving, by the first wireless communication device from each of the plurality of wireless communication devices, a first message including a second reference signal;

measuring, by the first wireless communication device, an RSRP on the second reference signal received from each of the plurality of wireless communication devices; and selecting, by the first wireless communication device, the second wireless communication device in response to determining that the measured RSRP associated with the second wireless communication device satisfies a threshold.

13. The wireless communication method of claim 1, further comprising:

receiving, by the first wireless communication device from each of a plurality of wireless communication devices in the sidelink communication, a first message including a second one of the reference signals;

measuring, by the first wireless communication device, within a time window, an RSRP on the second reference signal received from each of the plurality of wireless communication devices; and selecting, by the first wireless communication device, the second wireless communication device from the plurality of wireless communication devices in response to determining that the measured RSRP associated with the second wireless communication device satisfies a threshold.

14. The wireless communication method of claim 13, wherein the time window is configured prior to a timing that the first wireless communication device sends a location request to the second wireless communication device.

15. The wireless communication method of claim 1, further comprising:

determining, by the first wireless communication device, a first distance from the second wireless communication device to the first wireless communication device;

determining, by the first wireless communication device, a second distance from a wireless communication node to the first wireless communication device; and determining, by the first wireless communication device, the position based on the first distance and the second distance.

16. The wireless communication method of claim 15, wherein the first distance is determined based on a first timing when the first wireless communication device sends a first one of the references signals to the second wireless communication device, a second timing when the second wireless communication device receives the first reference signal, a third timing when the second wireless communication device sends a second one of the references signals to the first wireless communication device, and a fourth timing when the first wireless communication device receives the second reference signal.

17. The wireless communication method of claim 16, wherein the second distance is determined based on the first timing, the second timing, a fifth timing when the wireless communication node sends a third one of the reference signals, and a sixth timing when the first wireless communication device receives the third reference signal.

18. The wireless communication method of claim 1, further comprising:

receiving, by the first wireless communication device, a location measurement request from a second wireless communication device, which received the location measurement request from a location server; and transmitting, by the first wireless communication device, a location measurement report to the second wireless communication device configured to transmit the location measurement report to the location server.

19. A first wireless communication device in a sidelink communication, comprising:

at least one processor configured to:

receive, from a second wireless communication device via a sidelink communication, control information including a first one of a plurality of reference signals; and determine a position of the first wireless communication device based on the first one of the plurality of reference signals included in the control information, wherein the control information includes at least two sets;

wherein each of the sets indicates a respective cast type and a respective destination identification, wherein the cast type of one of the sets is indicated by a sidelink channel, and the cast type of other of the sets is indicated by the first one of the plurality of reference signals.

* * * * *